United States Patent
Imamura et al.

(10) Patent No.: US 6,750,290 B2
(45) Date of Patent: Jun. 15, 2004

(54) EPOXY RESIN COMPOSITION, METHOD OF IMPROVING SURFACE OF SUBSTRATE, INK JET RECORDING HEAD AND INK JET RECORDING APPARATUS

(75) Inventors: Isao Imamura, Kanagawa (JP); Hiromichi Noguchi, Tokyo (JP); Akihiko Shimomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 10/123,256

(22) Filed: Apr. 17, 2002

(65) Prior Publication Data

US 2003/0025760 A1 Feb. 6, 2003

(30) Foreign Application Priority Data

Apr. 19, 2001 (JP) ......................................... 2001-121026

(51) Int. Cl.⁷ .............................. B41J 2/06; B41J 2/135; C08L 33/14; C08L 43/04; C08L 63/00
(52) U.S. Cl. ...................... 525/116; 522/111; 522/112; 522/148; 522/154; 346/105; 346/140.1; 347/3; 347/45; 347/55
(58) Field of Search ................ 347/102, 3, 45, 347/55; 522/111, 112, 148, 154; 526/279; 346/105, 140.1; 525/116

(56) References Cited

U.S. PATENT DOCUMENTS

| 4,853,434 | A |   | 8/1989 | Block ........................ 525/100 |
| 5,102,960 | A |   | 4/1992 | Imai et al. ................... 525/476 |
| 5,179,142 | A |   | 1/1993 | Ono et al. ..................... 524/35 |
| 5,328,966 | A |   | 7/1994 | Nagaoka ..................... 525/476 |
| 5,486,634 | A |   | 1/1996 | Hahn et al. .................. 556/425 |
| 5,633,335 | A | * | 5/1997 | Manzouji et al. ............ 526/273 |
| 5,658,965 | A | * | 8/1997 | Manzouji et al. ............. 522/31 |
| 6,344,526 | B1 | * | 2/2002 | Noguchi et al. ............. 525/527 |
| 6,448,346 | B1 | * | 9/2002 | Noguchi et al. ............. 525/527 |
| 6,472,129 | B2 | * | 10/2002 | Noguchi et al. ............. 430/326 |
| 6,586,495 | B1 | * | 7/2003 | Shimomura et al. ........ 522/112 |

FOREIGN PATENT DOCUMENTS

EP 0 488 374 A2 6/1992

\* cited by examiner

*Primary Examiner*—Robert Sellers
(74) *Attorney, Agent, or Firm*—Fitzpatrick, Cella, Harper & Scinto (57) ABSTRACT

The present invention relates to a curing epoxy resin composition permitting water repellent and ink repellent surface treatment. The epoxy resin composition contains (A) an alkylsiloxane-containing epoxy resin, (B) a cationic polymerization catalyst, and (C) a polyfunctional epoxy compound having a molecular weight of 300 or more, and a static viscosity of 1,000 cps or more at 25° C.

10 Claims, 7 Drawing Sheets

EPOXY RESIN COMPOSITION, METHOD OF IMPROVING SURFACE OF SUBSTRATE, INK JET RECORDING HEAD AND INK JET RECORDING APPARATUS

BACKGROUND OF THE INVENTION

1. Field of the Invention

The present invention relates to a curing epoxy resin composition which permits water-repellent and ink (recording solution)-repellent surface treatment, and a method of treating a surface of a substrate by using the resin composition. Particularly, the present invention relates to an epoxy resin composition capable of forming a film pattern by irradiation with an active energy ray such as ultraviolet irradiation or the like, a method of treating a surface of a substrate by using the resin composition, an ink jet recording head subjected to ink-repellent treatment, and an ink jet recording apparatus using the ink jet recording head.

2. Description of the Related Art

In various fields, a method of applying a water-repellent coating to a member required to have water resistance and ink repellency to obtain these properties is generally known, and resin materials and coating materials used for the method have been developed.

For example, fluoropolyolefin and a fluororesin coating material having perfluoro groups are thermally and chemically stable, excellent in weather resistance, water resistance, solvent resistance, etc., and further excellent in release property, abrasion resistance and water repellency, and widely used for various applications.

For example, in an ink jet-system recording head in which an ink is discharged as droplets from a discharge orifice and adhered to paper or the like to record or form an image, the discharge orifice preferably has the following characteristics:

(1) Residual ink of ink columns having turned into droplets is immediately held back into a nozzle.
(2) Ink droplets adhering to a nozzle surface can be readily wiped off by a cleaning operation.
(3) The nozzle surface has excellent scratch resistance against the cleaning operation and paper transfer.
(4) In repeated formation of droplets and ink refilling, a meniscus is formed on the nozzle surface.
(5) The discharge direction is a normal to the meniscus.
(6) Even with an ink having low surface tension, or under low-negative pressure, a boundary tension, i.e., a contact angle, sufficient to form the meniscus is obtained.

These characteristics are desirable because they are directly concerned with improving printing performance of an ink jet recording head in which an ink adhering to the periphery of the orifice causes a deviation in the discharge (flying) direction of the ink droplets discharged from the orifice, thereby failing to perform printing with high precision. In order to prevent adhesion of the ink to the vicinity of the discharge orifice, which causes a deviation in the discharge direction, a method is known, in which the surface of the discharge orifice is subjected to water-repellent treatment.

SUMMARY OF THE INVENTION

The requirement for the performance of a water-repellent film has been significantly increased in response to recent rapid improvements in performance of ink jet printers. Namely, in an ink jet head, the water-repellent film is also required to have a high degree of fine processability (for example, excellent optical processability, or the like) with refinement of a nozzle and development of a multi-nozzle. Also, the water-repellent film must have basic characteristics such as adhesion to a substrate and ink resistance. For example, water repellency and adhesion are less affected by contact with an ink. In order to improve the performance of the ink itself, various attempts are made to improve the ink by using a polar organic solvent, adjusting the ink to a high pH value, and the like. In order to prevent the water repellency and adhesion to the substrate from deteriorating due to contact with the ink, the water-repellent film is required to have good ink resistance, for example, alkali resistance and hydrolysis resistance. It is difficult to develop a material satisfying these requirements and having a high degree of fine processability.

As a result of various investigations for solving the above problem, the inventors have found an epoxy resin composition having high resolution (excellent fine optical processability) and suitable for forming a water-repellent and ink-repellent cured film having a high contrast (excellent edge sharpness in optical processability).

Accordingly, an object of the present invention is to provide an epoxy resin composition capable of forming a cured film having excellent water-repellency, ink-repellency and ink resistance and high adhesion to a substrate, and capable of fine processing.

Another object of the present invention is to provide a method of treating a surface of a substrate capable of water-repellent treatment with high quality, durability and precision while selecting a treatment position,

A further object of the present invention is to provide an ink jet recording head capable of stably discharging ink, and an ink jet recording apparatus comprising the ink jet recording head.

In order to achieve these objects, in an aspect of the present invention, an epoxy resin composition comprises the following:

(A) An alkylsiloxane-containing epoxy resin having at least a monomer unit represented by the structural formula (a) below and a monomer unit represented by the structural formula (b) below, and at least two each of alkyl siloxane groups and alicyclic epoxy groups in its molecule.

(B) A cationic polymerization catalyst.

(C) A polyfunctional epoxy compound serving as a compatibilizer or reaction accelerator, and having a molecular weight of 300 or more, and a static viscosity at 25° C. of 1,000 cps or more.

-continued a = 1 to 50,
b = 2 to 100,
n = 2 to 100
$R^1, R^2$ = H or $CH_3$
$R^3, R^4$ = $CH_3$ or $R^5$ = —$CH_2$—, —$CH_2CH_2$—, or —$CH_2CH_2CH(CH_3)$—

In another aspect of the present invention, a method of selectively treating a surface of a substrate comprises the following steps:
(i) The step of coating a coating solution containing the epoxy resin composition on a substrate and then drying the resultant coating to form a film;
(ii) The step of irradiating the film with an active energy ray through a mask to form a pattern; and
(iii) The step of dissolving a portion of the film, which is not irradiated with the active energy ray, in a liquid capable of dissolving the composition.

In still another aspect of the present invention, a method of selectively treating a substrate surface comprises the following steps:
(i) The step of coating a coating solution containing the epoxy resin composition on a substrate and then drying the resultant coating to form a film;
(ii) The step of irradiating the film formed in the previous step with heat or an active energy ray to cure the film; and
(iii) The step of selectively removing the film cured in the step (ii).

In a further aspect of the present invention, an ink jet recording head comprising a discharge orifice for discharging an ink, wherein at least the periphery of the discharge orifice is coated with a cured film of the epoxy resin composition, is provided.

In a still further aspect of the present invention, an ink jet recording apparatus comprising the above-described ink jet recording head is provided.

Further objects, features and advantages of the present invention will become apparent from the following description of the preferred embodiments with reference to the attached drawings.

DESCRIPTION OF THE PREFERRED EMBODIMENTS

The present invention will be described in detail below with reference to a preferred embodiment.

Component (A): Alkylsiloxane-Containing Epoxy Resin

Component A used for an epoxy resin composition of the present invention is an alkylsiloxane-containing epoxy resin having at least a monomer unit represented by the structural formula (a) below and a monomer unit represented by the structural formula (b) below, and at least two each of alkyl siloxane groups and cyclic aliphatic epoxy groups in its molecule. Such component A is obtained by copolymerization of a monomer corresponding to the structural formula (a) and a monomer corresponding to the structural formula (b).

(a)

(b)

a = 1 to 50,
b = 2 to 100,
n = 2 to 100
$R^1, R^2$ = H or $CH_3$
$R^3, R^4$ = $CH_3$ or $R^5$ = —$CH_2$—, —$CH_2CH_2$—, or —$CH_2CH_2CH(CH_3)$—

By combining the epoxy resin (A) with component (C) described below, it is possible to obtain an epoxy resin composition having excellent coating performance and capable of forming a film having excellent ink-repellency and excellent workability such as a high drying property after solvent evaporation, and the like. Namely, the epoxy resin (A) has a binder function. By using such a material having a binder function, workability of pattern formation through exposure can be improved.

The epoxy resin (A) has the structural unit (a) containing a siloxane segment, and thus the resultant copolymer has low polarity, thereby deteriorating compatibility with the cationic curing catalyst described below. As a result, in some cases, curing reactivity of the entire epoxy resin composition deteriorates. Therefore, the epoxy resin composition of the present invention mainly composed of component A preferably contains a polyfunctional epoxy compound (component C) as a compatibilizer or a reaction accelerator.

Component B: Polymerization Initiator

The epoxy resin composition of the present invention contains a polymerization initiator (component B) serving as a catalyst for curing component A and component C described below. Component B used for this purpose is selected from materials known as curing agents for epoxy resins. The epoxy resin composition of the present invention can be polymerized by heat curing with an aromatic or aliphatic amine or an acid anhydride, or the like added thereto. In the present invention, particularly, the epoxy resin composition exhibits high reactivity to an onium salt of a Lewis acid. This reactivity is activated with an active energy ray. Thus, low-temperature curing is permitted. Such curing is suitable for selective surface treatment by a photolithographic method and for surface modification of a substrate difficult to maintain at high temperature. Examples of such an onium salt include bis(4-tert-butylphenyl)idonium salt, Optomer SP-150 and Optomer SP-170 (produced by Asahi Denka Kogyo K. K.) having the structures given below, Irugacure 261 (Ciba Specialty Co., Ltd.) represented by the structural formula below, and the like.

Component C: Polyfunctional Compound

The polyfunctional compound as component C preferably has a high molecular weight in order to increase resolution of the epoxy resin composition of the present invention used as a photosensitive resin composition. The molecular weight is preferably 300 or more depending upon the type and the amount of component A added. Although the viscosity depends upon the type and the amount of component A added, component C preferably has a static viscosity at 25° C. of 1,000 cps or more because the epoxy resin composition of the present invention should be in a solid state in order to form a pattern with high precision. In consideration of reactivity, and the desired mechanical properties and chemical resistance of the cured product, component C is preferably polyfunctional.

Examples of materials used as component C include compounds represented by the following formulae (C-1) to (C-9).

2(3,4-Epoxycyclohexyl-5,5-spiro-3,4-epoxy)cyclohexane-meta-dioxane (ERL-4234)

Optomer SP-150

Optomer SP-170

Irugacure 261

(C-2)

Novolak epoxy resin
(R = H:EPN Phenol novolak type
R = CH$_3$:ECN Cresol novolak type)

(C-3)

Bisphenol A epoxy resin (C-4)

2,2-bis[p-(2,3-epoxypropoxy)phenyl]-1,1,1,3,3,3-hexafluoropropane (C-5)

Diglycidyl phthalate (C-6)

Tetrakis (glycidyloxyphenyl) ethane (C-7)

Alicyclic solid epoxy resin
a + b + c = 15

Trade name EHPE3150; produced by Daicel Chemical Co., Ltd.

(C-8)

Polyfunctional alkicyclic epoxy resin (trifunctional)
a + b ≠ 0 to 1
Epolide GT300:a + b ≠ 0
Epolide GT301:a + b ≠ 1

(C-9)

Polyfunctional alicyclic epoxy resin (tetrafunctional)
a + b + c + d ≠ 0 to 1
Epolide GT400:a + b + c + d ≠ 0
Epolide GT401:a + b + c + d ≠ 1

In the above formulae, "EPN" represents phenol novolak epoxy, "ECN" represents cresol novolak epoxy, and "EHPE" and "Epolide GT300" and "Epolide GT400" are trade names of Daicel Chemical Industries, Ltd.

As described above, the epoxy resin composition of the present invention basically contains the alkylsiloxane-containing epoxy resin as component A, the cationic polymerization catalyst as component B, at least one polyfunctional compound (or resin) as component C serving as the compatibilizer or reaction accelerator. The mixing ratio of these components A, B and C in the epoxy resin composition is as follows. The ratio of component B serving as the catalyst is in the range of 0.5 to 6 parts by weight based on 100 parts by weight of the epoxy resin composition. The mixing ratio of components A and C depends upon the viscosity, the softening point and epoxy equivalent of each component, but the A:C ratio is about 10:90 to 90:10 (ratio by weight).

In some cases, component A has low compatibility with component B, and an onium salt of Lewis acid used as the catalyst has high polarity. Therefore, by using the component C as the compatibilizer or reaction accelerator, a photosensitive epoxy resin composition permitting surface treatment with higher resolution and contrast can be obtained.

The epoxy resin composition of the present invention is a polyfunctional epoxy resin type, has excellent adhesion to various members, can be cured at relatively low temperatures, and can provide a cured product having excellent physical properties as a structure. Furthermore, the epoxy resin composition contains component A having siloxane groups, and thus has improved resistance to a water-soluble organic solvent, particularly, a polar organic solvent. The function of component C can provide compatibility between the respective components to extend the range of material compositions.

When the onium salt of a Lewis acid activated by an active energy ray is used as the cationic polymerization catalyst for the epoxy resin composition of the present invention, surface treatment can be selectively performed with high precision to form, for example, a pattern. Since the cationic curing catalyst is used, component C added as the compatibilizer or reaction accelerator is preferably a alicyclic polyfunctional epoxy compound (resin) from the viewpoint of reactivity.

The epoxy resin composition of the present invention can be used for surface treatment with heating or irradiation of an active energy ray. In order to form a film by using the resin composition, the composition is dissolved in an aromatic, aliphatic hydrocarbon, ester, ether, or fluorocarbon solvent or the like to form a coating solution, and the resultant coating solution is coated by any one of various coating and printing methods such as a roll coater method, a spin coater method, a spray coater method, screen printing, gravure printing and the like. After the coating solution is coated on a substrate, the coating is cured by heating or irradiation with an active energy ray. As a source for the active energy ray, a mercury lamp, a laser beam, an electron beam, or the like, which contains large amounts of bright line spectra in the range of wavelengths of 200 to 480 nm, is preferred.

The epoxy resin composition of the present invention contains the binder component (component A) and prepared so as to form a dry solid film. Also, the epoxy resin composition can facilitate selective surface treatment such as patterning similar to a photoresist process. In this case, the above-described coating solution is coated on the substrate, irradiated with an active energy ray through a mask or in the form of a pattern after the solvent is removed, and then the uncured portion of the film is removed by development with a solvent system which can dissolve the film. When energy beam irradiation in the form of a pattern is insufficient for curing, post curing is performed after development. As the energy source for post curing, heating with a microwave or the like, or active energy ray irradiation by an electron beam, ultraviolet rays, or the like is used.

The method of surface treatment in the form of a pattern can be achieved by coating the coating solution on the substrate, irradiating the coating with an active energy ray though a mask, and then performing development with a developer. Although the basic steps are the same as a photolithography process, a solvent or a solvent composition suitable for the photosensitive resin composition of the present invention is selected as the developer. As the developer, any one of aromatic hydrocarbons, ketones, esters, glycol ethers, mixtures thereof, and the like can be used.

In the method of surface treatment in the form of a pattern, in order to complete curing reaction of the film, heating or active energy ray irradiation is preferably further performed as post curing after development. The photosensitive resin composition of the present invention can be cured at a relatively low temperature to provide a cured product having excellent water-repellency, oil-repellency, adhesion, chemical resistance, and abrasion resistance.

Therefore, the epoxy resin composition of the present invention can be used as a water repellent or water-repellent coating material applied to a surface which may come into contact with a solution or material containing a component such as a polar organic solvent, which deteriorates the adhesion of the water repellent. The epoxy resin composition can also be used as a material for water-repellent and ink-repellent treatment of the discharge orifice surface of an ink jet recording head.

The application of the photosensitive epoxy resin composition of the present invention to an ink jet recording apparatus has the following effects, for example.

Selective and high-precision surface modification can be achieved as a result of the polymerizability of the resin composition.

Optical pattering with excellent processing precision (high contrast) can be achieved.

A resultant cured film which is a solid with excellent strength can be achieved.

Device durability is high due to abrasion strength.

Water repellency and ink repellency are high.

High water repellency and ink repellency cause improvements in dynamic characteristics such as meniscus retention of an aqueous ink, a cleaning property, accuracy of the discharge direction of ink droplets, persistency of continuous discharge, suitability for print start after a pause, etc. The meniscus retention represents the property that an ink maintains the ink surface at the nozzle tip by surface tension, and recovers and holds a meniscus (refer to reference numeral 23 in FIG. 1) at a predetermined position during repeated droplet discharge. With low meniscus retention, the ink leaks from the nozzle tip, the meniscus retreats to decrease the volume of the droplet discharged, or in an extreme case, a defect occurs in discharge of ink droplets.

In application to an ink jet recording head, the nozzle surface is treated with the photosensitive resin composition of the present invention to form a surface with a good release property, which does not cause strong adhesion to ink, and facilitates wiping of ink by cleaning. Many cleaning mechanisms mounted on ink jet recording heads perform wiping with a rubber blade, pump suction, discharge at a position other than on a recording sheet, and the like. Any one of these methods cannot eliminate the phenomenon that small droplets of excessive ink adhere to the periphery of the nozzle because not all of the ink is turned into ink droplets when an ink column withdrawn by discharge pressure forms into a droplet. Therefore, if the fine droplets spontaneously drop, are sucked back to the inside of the nozzle, or are readily removed, the droplets have no influence on ink discharge.

Figure 1:
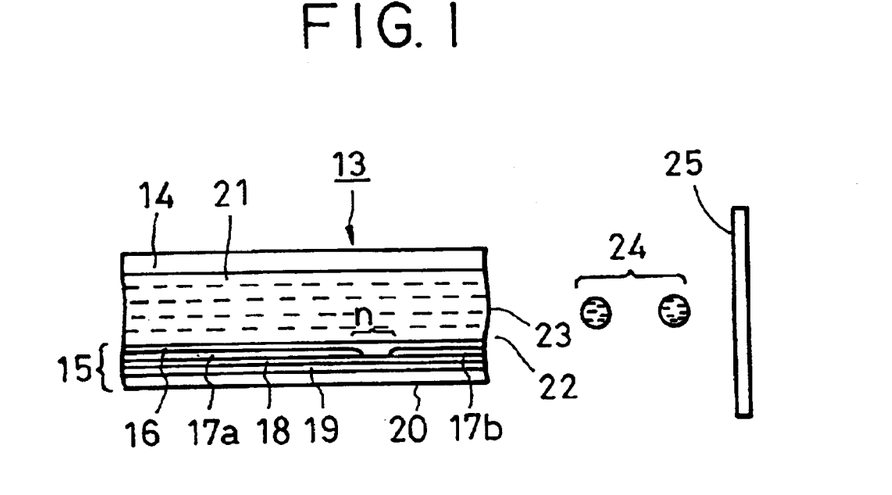
FIG. 1 is a sectional view of a principal portion of an example of an ink jet head construction to which the present invention is applied.
Figure 2:
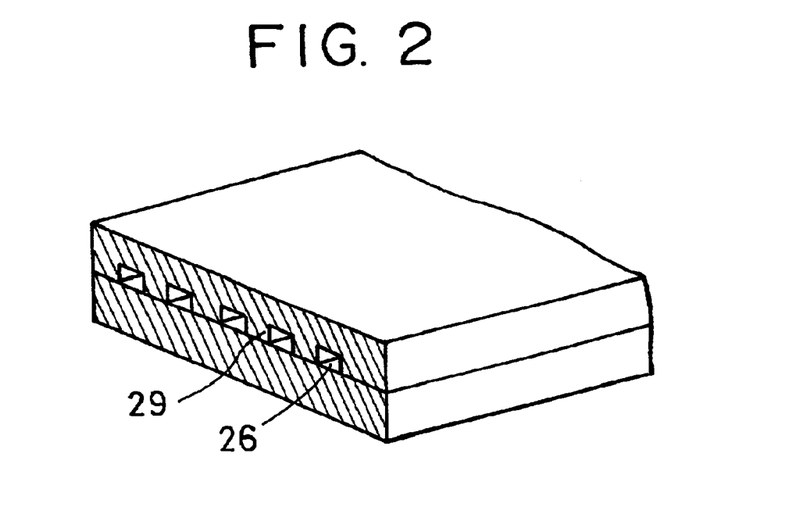
FIG. 2 is a perspective view of the principal portion of the head shown in FIG. 2.

FIGS. 1 and 2 show the principal portion of an example of the construction of an ink jet recording head to which the photosensitive resin composition of the present invention can be applied. FIG. 1 is a sectional view, and FIG. 2 is a perspective view.

The recording head 13 shown in FIG. 1 comprises a substrate 15 on which discharge energy generation means is disposed, and a member 14 laminated on the substrate 15 by forming a predetermined pattern of a cured product of a thermosetting resin composition and/or an active energy ray curing resin composition to form at least a flow path. The substrate 15 comprises a base 20 made of a material with a high heat release effect, such as alumina or the like, and a heat storage layer 19, an exothermic resistor layer 18 made of a metal, electrodes 17a and 17b made of aluminum or the like, and a protective layer 16, which are laminated in this order on the surface of the base 20. By supplying electricity to the electrodes 17a and 17b, the discharge energy generating element formed in a portion (in the region shown by character n in FIG. 1) of the exothermic resistor layer 18, in which the electrodes are not formed, generates heat to exert thermal energy on an ink positioned above the element.

In recording, in the state in which an ink 21 is caused to fill in a discharge orifice (orifice) 22 as a micro opening at the tip, when a current is passed through the electrodes 17a and 17b corresponding to a recording signal, heat is rapidly generated from the region n, and bubbles occur in the ink 21 in contact with the region n due to film boiling to discharge the ink 21 as droplets 24 from the orifice 22 by the pressure of the bubbles. Therefore, the droplets 24 fly toward a recording medium 25.

In an ink jet recording head according to the present invention, the epoxy resin composition of the present invention is used as a water-repellent and ink-repellent agent in the peripheries of at least the orifice openings 26 of the orifice surface 29 shown in FIG. 2, followed by patterning and curing to form a film. This effectively prevents the droplets (ink or the like) from adhering to the surface to prevent a deviation in the discharge direction of the droplets. In addition, the cured product of the epoxy resin composition of the present invention not only exhibits excellent adhesion to the substrate but also causes substantially no deterioration in water repellency and adhesion even when the ink contains an organic solvent, particularly, a polar organic solvent.

Figure 3:
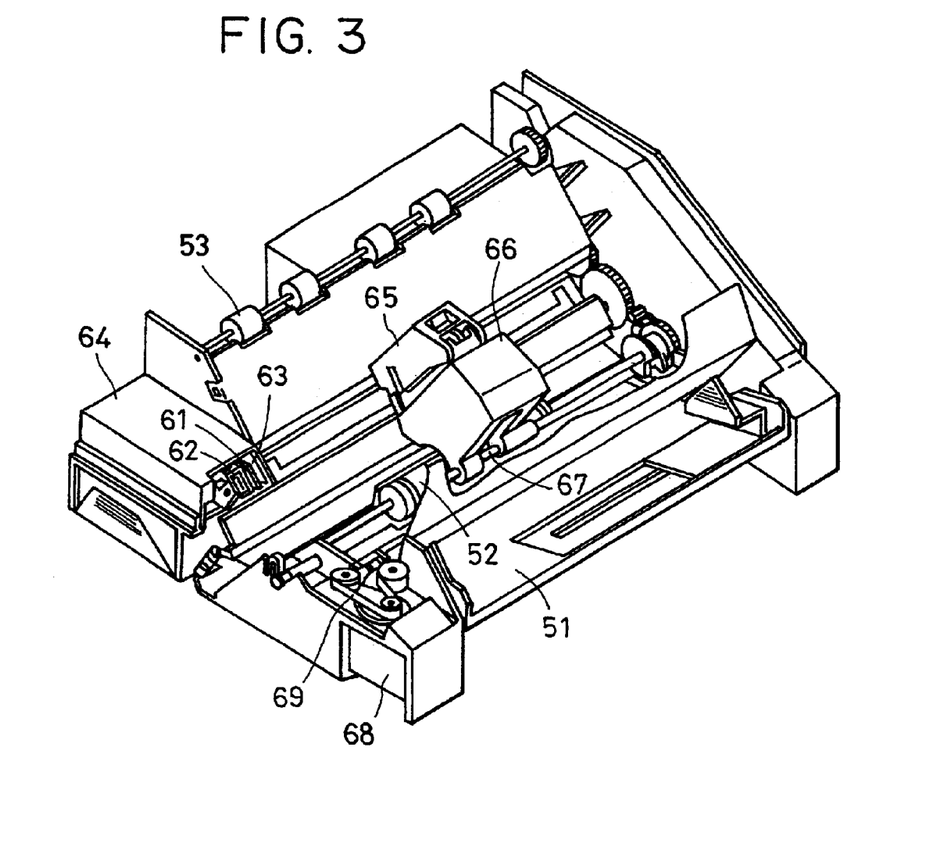
FIG. 3 is a drawing showing an example of an ink jet recording apparatus including the head shown in FIG. 2.

FIG. 3 shows an example of an ink jet recording apparatus including such a multi-head as shown in FIG. 2. In FIG. 3, reference numeral 61 denotes a blade serving as a wiping member, one end of which is a fixed end held by a blade holding member to establish a cantilever state. The blade 61 is disposed at a position adjacent to a recording region of the recording head. In this example, the blade 61 is held to project into the movement path of the recording head. Reference numeral 62 denotes a cap disposed at a home position adjacent to the blade 61, and is moved perpendicularly to the movement direction of the recording head to cap the orifice in contact therewith. Furthermore, reference numeral 63 denotes an ink absorber provided adjacent to the blade 61 held to project into the movement path of the recording head in the same manner as the blade 61. The blade 61, the cap 62 and the ink absorber 63 constitute a discharge recovery section 64 for removing moisture, dust particles, and the like from the ink discharge orifice surface by the blade 61 and the ink absorber 63.

Reference numeral 65 denotes an ink jet recording head, for example, having a construction in which an ink is discharged by thermal energy, as shown in FIGS. 1 and 2. Reference numeral 66 denotes a carriage for moving the recording head 65 mounted thereon. The carriage 66 is slidably engaged with a guide shaft 67, and partially connected (not shown in the drawing) to a belt 69 driven by a motor 68. Therefore, the carriage 66 can be moved along the guide shaft 67, i.e., can be moved to the recording region of the recording head 65 and the adjacent region thereof.

Reference numeral 51 denotes a paper feed section into which a recording paper is inserted, reference numeral 52 denotes a paper feed roller driven by a motor not shown in the drawing. This construction permits the recording medium to be fed to a position opposite to the discharge orifice surface of the recording head, and expelled through a paper-expelling roller 53 with proceeding of recording.

In the above-described construction, when the recording head 65 is returned to the home position at the end of recording, the cap 65 of the head recovery section 64 is retreated from the movement path of the recording head 65, while the blade 61 projects into the movement path. As a result, the orifice surface of the recording head 65 is wiped. When the recording head 65 is capped with a cap 62 in contact with the orifice surface, the cap 62 is moved to project into the movement path of the recording head 65.

When the recording head 65 is moved from the home position to the start position of recording, the cap 62 and the blade 61 are at the same positions as the time of wiping. As a result, in this movement, the orifice surface of the recording head 65 is wiped.

Although the recording head 65 is moved to the home position at the times of recording end and recovery, but the recording head 65 is also moved to the home position adjacent to the recording region of the recording head at predetermined intervals when the recording head 65 is moved in the recording region for recording. During this movement, the discharge surface is also wiped.

In color recording, the ink jet recording apparatus can use a recording head in which discharge orifices for cyan, magenta, yellow and black inks are arranged in a line. Alternatively, recording heads for the respective colors may be arranged in a line. In this case, each of the color inks may be discharged from one discharge orifice, or simultaneously discharged from a plurality of discharge orifices to adhere at least two droplets of the same color to the recording medium.

The recording head of the present invention is subjected to surface treatment with an ink repellent material having the above-described composition, and has the chemical properties described in Examples below. Therefore, an ink is less adhered, or the adhered ink can be easily removed by a cleaning wiper blade, thereby significantly improving substantial retention of a print.

An example of the method of using the epoxy resin composition of the present invention will be described. In active energy ray curing, as described above, a photo cation catalyst which releases a Lewis acid by light is used as a catalyst. In heat curing, a Lewis acid such as a trifluoro arsenic amine catalyst or the like may be added.

The epoxy resin composition of the present invention is dissolved in an organic solvent, and used in the form of a coating solution. With a coating thickness of as small as several $\mu$m, an ordinary fine coating device such as a roll coater, a spin coater, a spray coater, or the like can be used.

A first method of surface treatment in the form of a pattern can be achieved by coating the coating solution on a substrate to which water repellency is to be imparted to form a film, selectively irradiating the film with an active energy ray by using a mask, and then performing development with a developer. Although these basic steps are the same as the photolithography process, a solvent or a solvent composition suitable for the photosensitive resin composition of the present invention must be selected as the developer. As the developer, any one of aromatic hydrocarbons, ketones, esters, glycol ethers, and the like, and mixtures thereof can be used. In order to achieve the completion of the curing reaction of the film composed of the resin composition, heating or active energy ray irradiation is preferably performed as post curing after development.

A second method of surface treatment in the form of a pattern comprises the step (1) coating the coating solution on the substrate to form a film, the step (2) of irradiating the whole surface with an active energy ray which accelerates polymerization to cure the film, and the step (3) of irradiating the film with a decay active energy ray to selectively remove a desired portion of the cured portion of the film. The example for a light source as the active energy ray for accelerating polymerization includes high pressure mercury lamp. The example for a light source emitting the decay active energy ray includes an excimer laser, or the like. In the second method, in order to complete the curing reaction, heat treatment or irradiation with a polymerizing active energy ray is preferably performed in any one of the steps.

As described above, the epoxy resin composition of the present invention is useful as a water repellent agent or water repellent coating material applied to a surface which may come into contact with a solution or a material containing a component such as a polar organic solvent, which deteriorates the adhesion of the water repellent agent. The epoxy resin composition can also be used for water repellent and ink repellent treatment of the discharge orifice surface of the ink jet recording head.

EXAMPLES

The present invention is described in further detail below with reference to examples. Examples of the construction of the photosensitive resin composition of the present invention are described below. In the description below, "parts" represents a "ratio by weight of a solid content".

<Mixture Example 1>

| | |
|---|---|
| Component A-1 | 10 parts |
| Compound Example C-7 | 90 parts |
| (Trade name: EHPE3150; produced by Daicel Chemical Industries, Ltd., number average molecular weight 1000, solid at 25° C.) | |

<Mixture Example 2>

| | |
|---|---|
| Component A-1 | 30 parts |
| Compound Example C-4 | 40 parts |
| (Molecular weight 448, solid at 25° C.) | |
| Compound Example C-9 | 30 parts |
| (Trade name: Epolide GT-401; produced by Daicel Chemical Industries, Ltd., molecular weight 840 to 940, viscous liquid at 25° C.) | |

<Mixture Example 3>

| | |
|---|---|
| Component A-1 | 30 parts |
| Compound Example C-4 | 30 parts |
| (Molecular weight 448, solid at 25° C.) | |
| Compound Example C-7 | 40 parts |
| (Trade name: EHPE3150; produced by Daicel Chemical Industries, Ltd., number average molecular weight 1000, solid at 25° C.)) | |

<Mixture Example 4>

| | |
|---|---|
| Component A-1 | 100 parts |

<Mixture Example 5>

| | |
|---|---|
| Component A-1 | 10 parts |
| Celloxide 2021 | 90 parts |

In each of above mixture examples 1 to 5, component A-1 is an epoxy resin having a number average molecular weight of 15000, and a unit represented by the formula (a) below in which n=68 and a=1, and a unit represented by the formula (b) below in which b=53.

a = 1 to 50,
b = 2 to 100,
n = 2 to 100

Celloxide 2021 is an alicyclic epoxy compound (produced by Daicel Chemical Co., Ltd.) having a molecular weight of 252 and a static viscosity of 100 to 400 cps at 25° C., and represented by the following formula:

By using each of the mixture examples 1 to 5, examples 1 to 5 of the epoxy resin composition (photosensitive resin composition (coating solution) having the composition below were prepared. Examples 1 to 3 correspond to mixture examples 1 to 3, and comparative examples 1 and 2 correspond to mixture examples 4 and 5, respectively.

| <Photosensitive resin composition> | |
|---|---|
| Any one of resin mixtures 1 to 5 | 100 parts |
| Cationic polymerization initiator (Trade name: Adekaoptomer SP-170, produced by Asahi Denka K. K.) | 2 parts |
| Silane coupling agent (Trade name: A-187, produced by Nippon Unicar Co., Ltd.) | 3 parts |
| Solvent (diglyme) | 100 parts |

By using each of coating solution examples 1 to 5 prepared as described above, an ink jet recording head of each of examples 1 to 3 and comparative examples 1 and 2 was formed according to the following procedure. The heads prepared by using coating solution examples 1 to 3 correspond to the heads of examples 1 to 3, and the heads prepared by using coating solution examples 4 and 5 correspond to the heads of comparative examples 1 and 2, respectively.

An example of the manufacture of the ink jet recording head (simply referred to as the "head" hereinafter) of each of the examples and comparative examples will be described with reference to the drawings. FIGS. 4 to 11 are drawings each showing a basic step for manufacturing the head. Each of the drawings shows the head having two discharge orifices for the sake of simplification. The head may be a high-density multi-array type head having more discharge orifices, or a head having only one discharge orifice.

Figure 4:
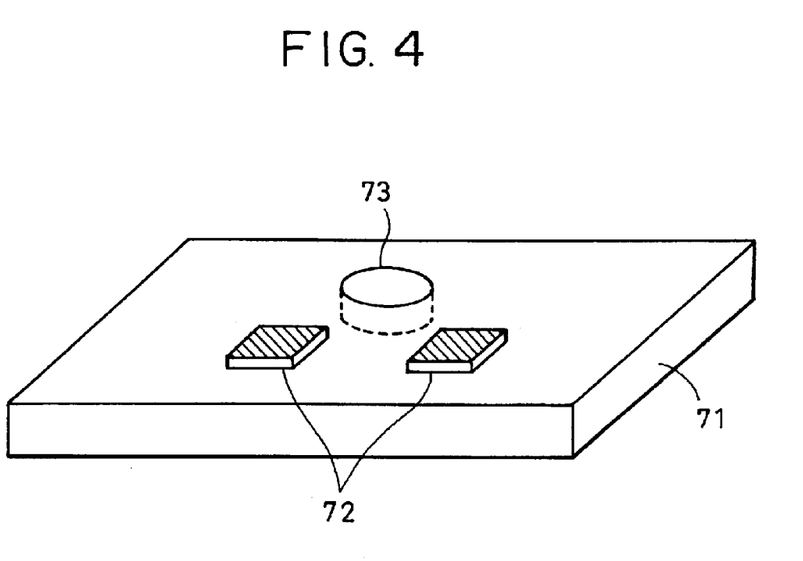
FIG. 4 is a drawing showing a step for manufacturing a head in accordance with an embodiment.

FIG. 4 is a schematic perspective view of a head substrate 71 used in this example. First, as shown in FIG. 4, the head substrate 71 made of silicon, glass, ceramics, plastics, or a metal is prepared. In this embodiment, the head substrate made of silicon was used. The head substrate 71 functions as a part of an ink flow path component, and may function as a support for a coated resin layer described below. The shape, the material, and the like of the head substrate 71 are not limited.

The head substrate 71 has a desired number of discharge energy generating elements 72 such as electrothermal conversion elements or piezoelectric elements, or the like, which are provided on the head substrate 71. FIG. 4 shows two discharge energy generating elements 72 for the sake of simplification. The discharge energy generating elements 72 supply discharge energy for discharging ink droplets to an ink to perform printing. For example, in use of the electrothermal conversion elements as the discharge energy generating elements 72, the ink near the electrothermal conversion elements is heated by the elements to generate discharge energy, discharging the ink.

Also, a control signal input electrode (not shown) is connected to the discharge energy generating elements 72, for operating the elements. In order to improve the durability of the discharge energy generating elements 72, any one of various functional layers such as a protective layer and the like is generally provided on the discharge energy generating elements 72. In the present invention, such a functional layer may be provided on the discharge energy generating elements 72.

Furthermore, the head substrate 71 comprises an ink supply port 73 provided by forming a through hole at a position of the head substrate 71, where the discharge energy generating elements 72 are absent, for supplying the ink into the ink flow path.

Figure 5:
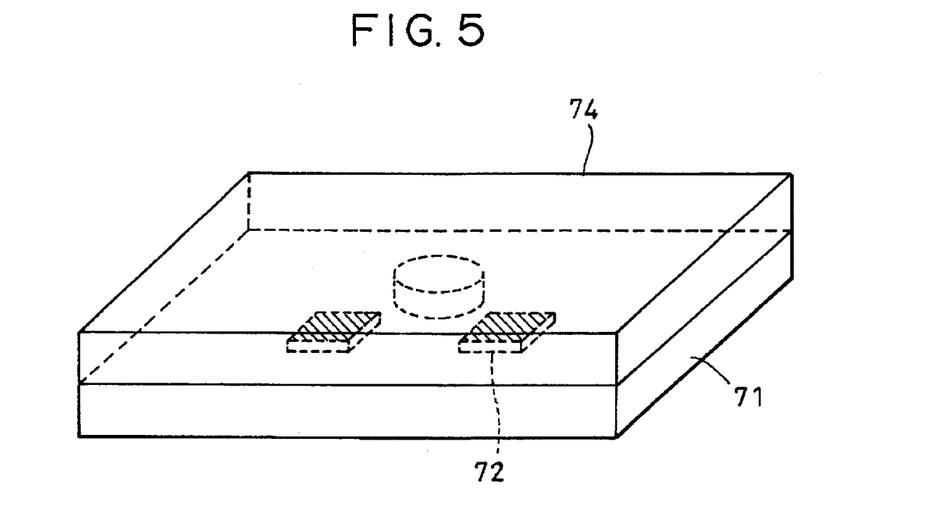
FIG. 5 is a drawing showing a step after the step shown in FIG. 4.

Next, as shown in FIG. 5, a photosensitive resin layer 74 is formed on the head substrate 71 to cover the discharge energy generating elements 72. From the viewpoint of patterning properties and high solubility, a positive photosensitive resin is preferably used as a material of the photosensitive resin layer 74. The photosensitive resin layer 74 can be formed by dissolving the photosensitive resin in a solvent, coating the resultant solution on a film of a PET film or the like to form a dry film, and then transferring the film to the head substrate 71 by a laminator.

Alternatively, by forming the ink supply port 73 by anisotropic etching in the head substrate 71 comprising the coated resin layer 74 formed thereon, coating on the head substrate 71 can be performed by a solvent coating method such as a spin coating method, a roll coating method, or the like.

Figure 6:
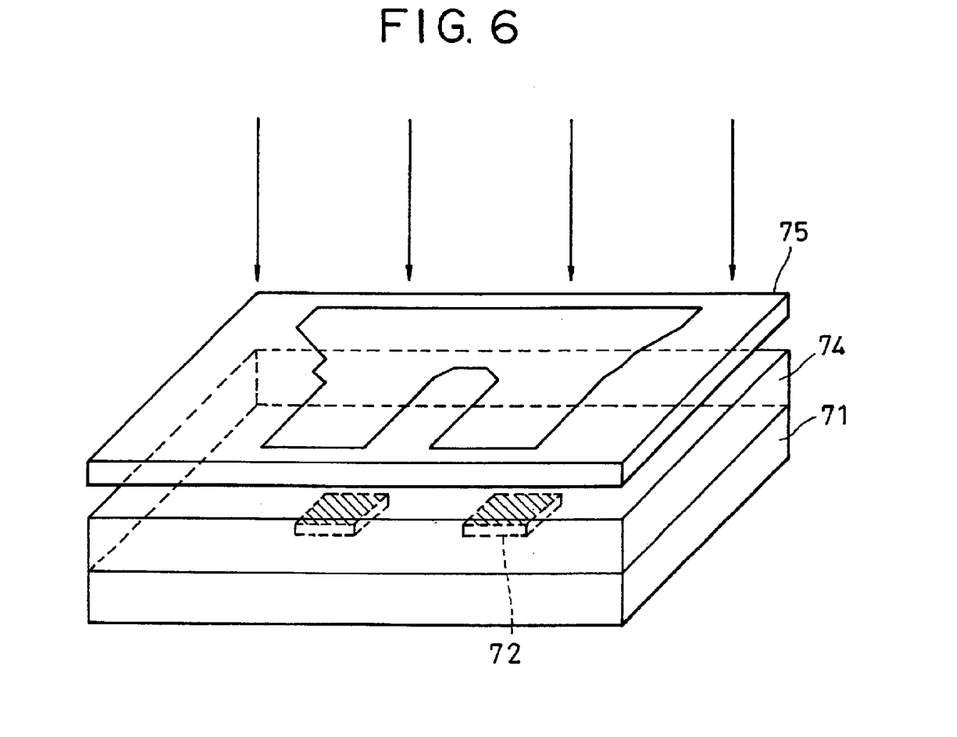
FIG. 6 is a drawing showing a step after the step shown in FIG. 5.
Figure 7:
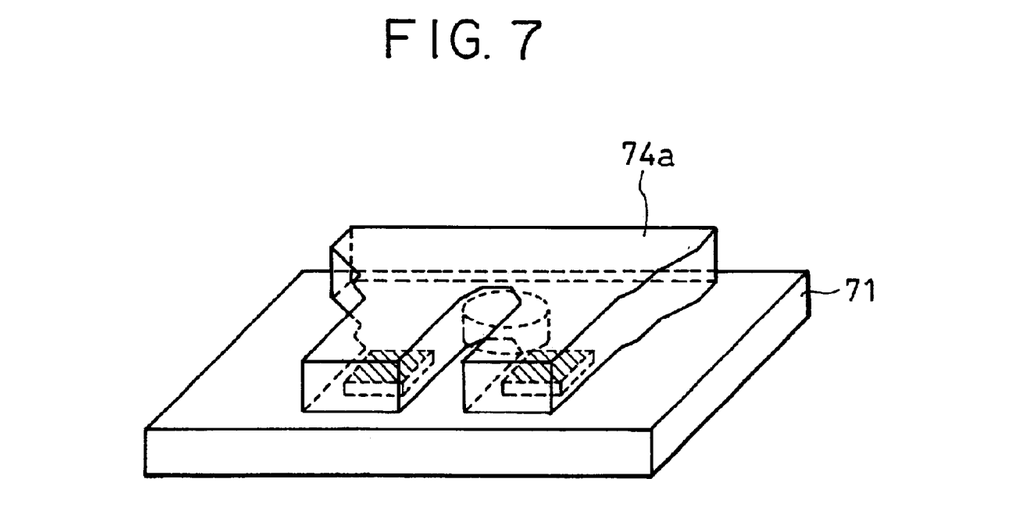
FIG. 7 is a drawing showing a step after the step shown in FIG. 6.

Next, as shown in FIG. 6, the photosensitive resin layer 74 is irradiated with an active energy ray such as ultraviolet rays, ionizing radiation, or the like, with the exception of a portion constituting the ink flow path to solubilize the layer 74. Then, the solubilized portion is eluted with a solvent to form an ink flow path pattern 74a, as shown in FIG. 7. The ink flow path pattern 74a secures an ink flow path provided with the ink supply port 73 and the discharge energy generating elements 72. The pattern of the photosensitive resin layer remains in a portion where the ink flow path is formed (refer to FIG. 7). In this example, ODUR1010 produced by Tokoyo Ohka is used as the photosensitive resin.

Figure 8:
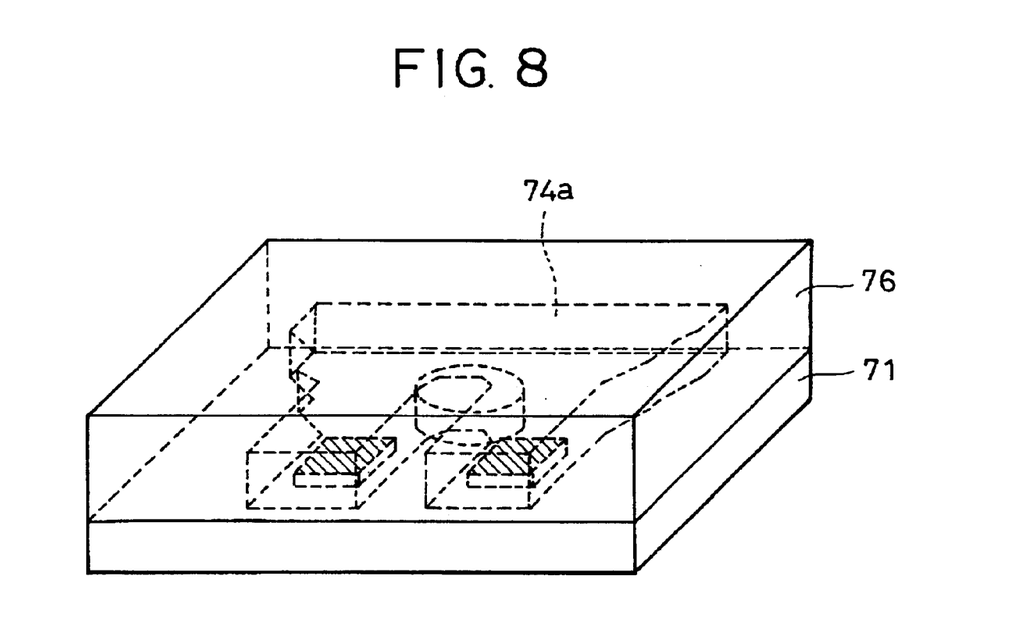
FIG. 8 is a drawing showing a step after the step shown in FIG. 7.
Figure 9:
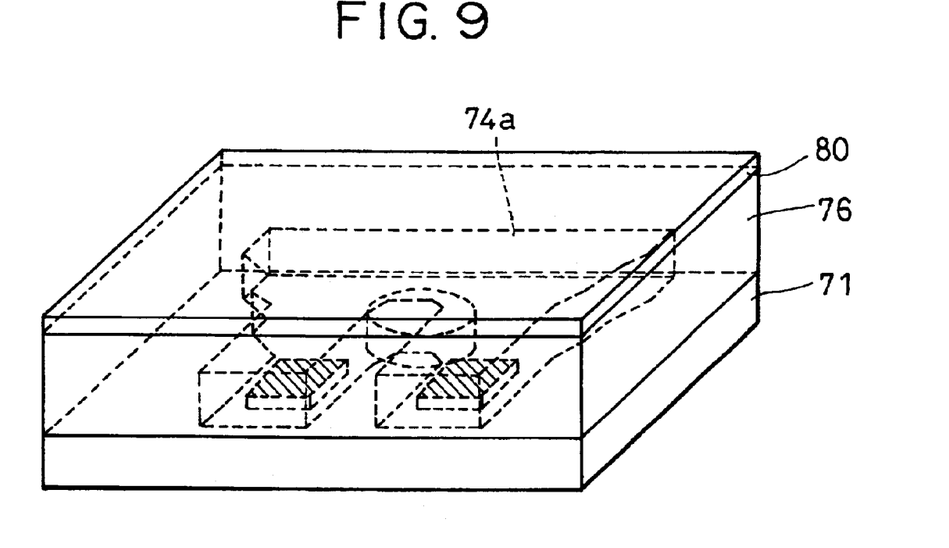
FIG. 9 is a drawing showing a step after the step shown in FIG. 8.

Next, as shown in FIG. 8, a coated resin layer 76 is formed on the ink flow path pattern 74a to cover the pattern 74a, for forming the flow path. Since the coated resin layer 76 serves as a structural material of the head, the coated resin layer 76 is required to have properties such as high mechanical strength, heat resistance, adhesion to the head substrate 71, ink resistance, etc. Examples of the material for forming the coated resin layer 76 which satisfies the above properties include curing resins such as epoxy resins, acrylic resins, diglycol dialkylcarbonate resins, unsaturated polyester resins, diaryl phthalate resins, polyurethane resins, polyimide resins, melamine resins, phenol resins, urea resins, and the like. Of course, a general curing agent is added to the curing resins, and if required, light or thermal energy is applied to cause curing reaction. In this example, a photocuring epoxy resin composition having the composition below is used.

| | |
|---|---|
| Polyfunctional epoxy resin (Trade name: EHPE3150, produced by Daicel Chemical Co., Ltd.) | 100 parts |
| Cationic polymerization initiator (Trade name: Adekaoptomer SP-170, produced by Asahi Denka K. K.) | 2 parts |
| Silane coupling agent (Trade name: A-187, produced by Nippon Unicar Co., Ltd.) | 4 parts |
| Solvent (diglyme) | 100 parts |

The coated resin layer 76 is formed by dissolving the curing resin in a desired solvent, and then coating the resultant solution by a solvent coating method. Then, each of coating solution examples 1 to 5 comprising the photosensitive resin composition of each of the examples and comparative examples is coated on the coated resin layer 76 to form a water repellent layer 80. However, spin coating causes dissolution of the under layer, and thus a curtain coating method is used for coating.

Next, ink discharge orifices are formed by the photolithography process. For example, the ink discharge orifices can be formed by the photolithography process according to the following procedure.

Figure 10:
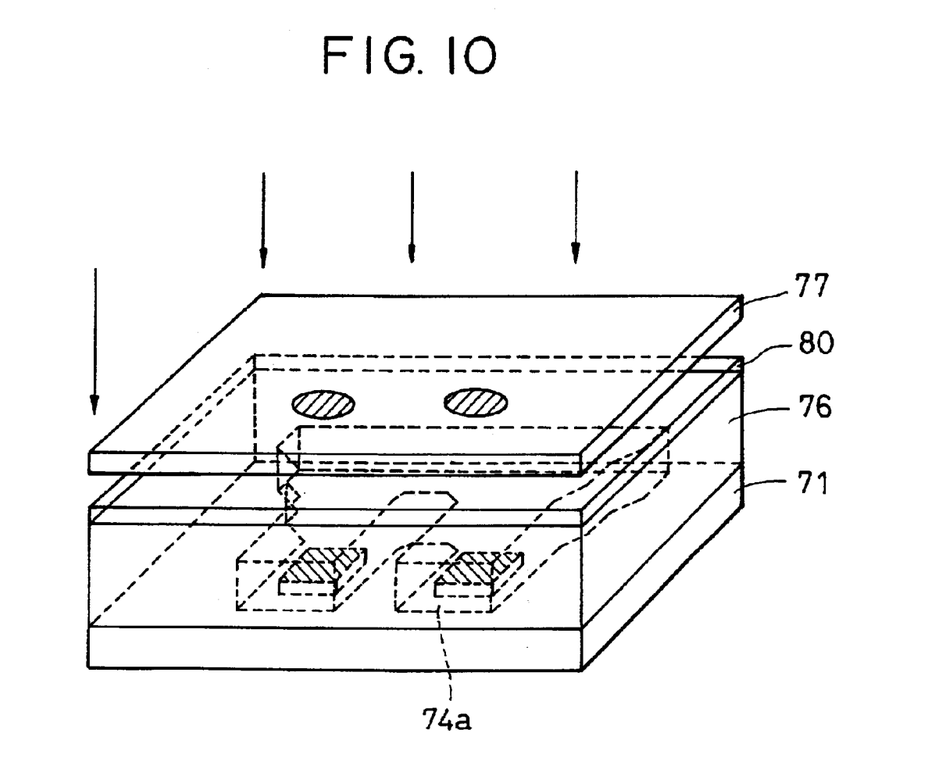
FIG. 10 is a drawing showing a step after the step shown in FIG. 9.
Figure 11:
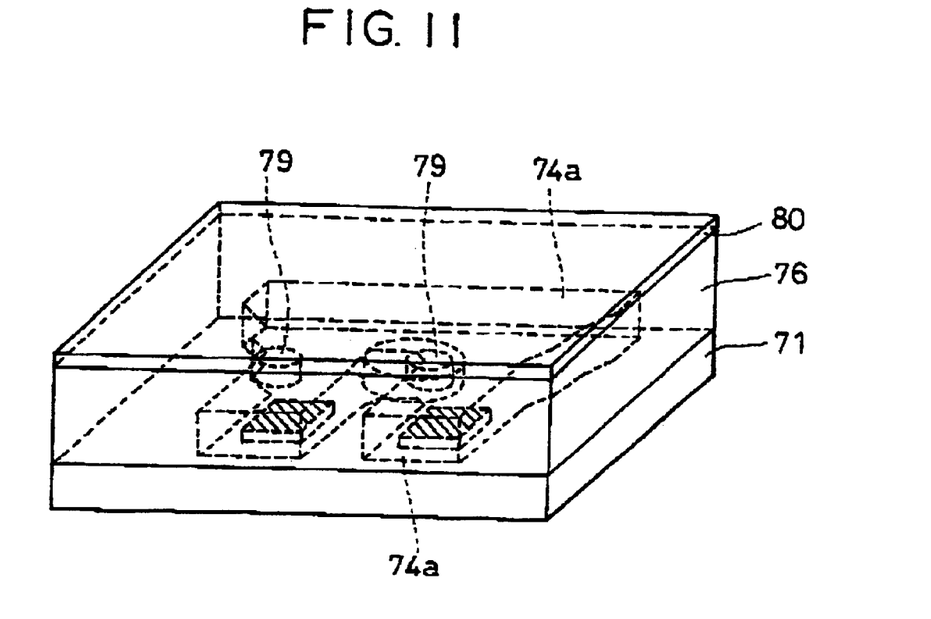
FIG. 11 is a drawing showing a step after the step show in FIG. 10.

In forming the ink discharge orifices by the photolithography process, the coated resin layer 76 is formed by using a coated resin layer material having negative photosensitivity. As shown in FIG. 10, the coated resin layers 76 and 80 having negative photosensitivity are exposed to light through an orifice formation patterning mask 77 in which the orifice portions are shielded. Therefore, the exposed portions of the coated resin layers 76 and 80 are cured to permit patterning of the portions where the ink discharge orifices are formed. As shown in FIG. 11, the unexposed portions of the coated resin layers 76 and 80 are eluted with a solvent to form the ink discharge orifices 79 in the coated resin layers 76 and 80. In this example, the discharge orifices have a diameter of 10 $\mu$m.

Although the ink discharge orifices 79 are formed by the photolithography process, the ink discharge orifices 79 can be formed by a method in which a patterning mask having an ink discharge orifice pattern is provided on the coated resin layers, followed by irradiation with an excimer laser, or a method of dry etching with oxygen plasma. When the orifices are formed by oxygen plasma or excimer laser, the coated resin layers are cured.

Next, the ink flow path pattern 74a is irradiated with ionizing radiation through the coated resin layers 76 and 80 to solubilize the ink flow path pattern 74a. Finally, the solubilized ink flow path pattern 74a is eluted with a solvent to form the ink flow path. The head is obtained as described above.

Although, an example of the manufacture of a side shooter type head is described above, the present invention, of course, can be applied to the manufacture of a so-called edge shooter type head in which ink is discharged along the plane on which the discharge energy generating elements are provided. In application of the present invention to the manufacture of the edge shooter type head, the discharge orifices are provided in the end surface of the head substrate on which the coated resin layers are provided, and thus the above-described discharge orifice forming step is not required.

A test of discharge durability was conducted by using each of the heads formed in the above experiment. Each of the heads was incorporated into a printer with predetermined electric wiring, and a long-term durability test was conducted by using an ink jet ink comprising pure water, glycerin, Food Black 2 (water soluble black dye), N-methylpyrrolidone at a ratio of 70/15/3/12 (parts by weight). In a print durability test, a document and a pattern for evaluating landing precision were printed on 100 sheets, and dot disorder was evaluated from the final print sample.

The heads of examples 1 to 3 of the present invention showed character sharpness without a deviation in the dot positions. On the other hand, the heads of comparative examples 1 and 2 showed a slight deviation in the dot positions, but character quality was less affected. As a result of observation of the head of comparative example 1, no change was observed, as compared with the heads of examples 1 to 3. However, in observation of the film formed by evaporating the solvent of the coating solution 4, a haze was observed. It is thought that in the head prepared by using this coating solution 4, blurring possibly occurs in a pattern image of the orifices due to the haze of the film.

Similarly, in the head of comparative example 2, no change was observed, as compared with the heads of examples 1 to 3. However, in observation of the film formed by evaporating the solvent of the coating solution 5, a tuck was observed, and thus an image was possibly blurred in patterning of the orifices. In all heads, no difference was observed in print quality between the initial stage and stage after the print durability test.

As described above, a film of a photosensitive resin composition of the present invention exhibits a large contact angle, and good durability. The film also causes no ink adhesion to a head surface even in contact with the head for a long time, thereby improving the landing precision of dots, and maintaining print quality for a long time. Also, the film has high resolution and high contrast, and thus can provide excellent print quality even when a fine discharge orifice is used.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink jet recording head comprising a discharge orifice for discharging an ink, wherein at least a periphery of the opening of the discharge orifice is coated with a cured film of an epoxy resin composition, the epoxy resin composition comprising:

(A) an alkylsiloxane-containing epoxy resin having at least a monomer unit represented by the structural formula wherein a is 1 to 50, n is 2 to 100, $R^1$ is H or $CH_3$, and $R^3$ and $R^4$ are $CH_3$ or and a monomer unit represented by the structural formula wherein b is 2 to 100, $R^2$ is H or $CH_3$, and $R^5$ is $CH_2$, $CH_2CH_2$, or $CH_2CH_2CH(CH_3)$;

(B) a cationic polymerization catalyst; and

(C) an alicyclic polyfunctional epoxy compound having a molecular weight of 300 or more, and a static viscosity at 25° C. of 1,000 cps or more, wherein the alicyclic polyfunctional epoxy compound is contained as a compatibilizer or a reaction accelerator.

2. An ink jet recording apparatus provided with an ink jet recording head, wherein the ink jet recording head is that of claim 1.

3. The ink jet recording head according to claim 1, wherein the alicyclic polyfunctional epoxy compound has the following structural formula:

4. The ink jet recording head according to claim 1, wherein the alicyclic polyfunctional epoxy compound has the following structural formula:

wherein a+b+c equals 15.

5. The ink jet recording head according to claim 1, wherein the alicyclic polyfunctional epoxy compound has the following structural formula:

wherein a+b does not equal 0 to 1.

6. The ink jet recording head according to claim 1, wherein the alicyclic polyfunctional epoxy compound has the following structural formula:

wherein a+b+c+d does not equal 0 to 1.

7. An ink jet recording head comprising a discharge orifice for discharging an ink, wherein at least a periphery of the opening of the discharge orifice is coated with a cured film of an epoxy resin composition, the epoxy resin composition comprising:

(A) an alkylsiloxane-containing epoxy resin having at least a monomer unit represented by the structural formula wherein a is 1 to 50, n is 2 to 100, $R^1$ is H or $CH_3$, and $R^3$ and $R^4$ are $CH_3$ or and a monomer unit represented by the structural formula wherein b is 2 to 100, $R^2$ is H or $CH_3$, and $R^5$ is $CH_2$, $CH_2CH_2$, or $CH_2CH_2CH(CH_3)$;

(B) a cationic polymerization catalyst; and (C) an alicyclic polyfunctional epoxy compound having a molecular weight of 300 or more, and a static viscosity at 25° C. of 1,000 cps or more, wherein the alicyclic polyfunctional has the following structural formula:

wherein a+b+c equals 15.

8. An ink jet recording apparatus provided with an ink jet recording head, wherein the ink jet recording head is that of claim 7.

9. An ink jet recording head comprising a discharge orifice for discharging an ink, wherein at least a periphery of the opening of the discharge orifice is coated with a cured film of an epoxy resin composition, the epoxy resin composition comprising:

(A) an alkylsiloxane-containing epoxy resin having at least a monomer unit represented by the structural formula wherein a is 1 to 50, n is 2 to 100, $R^1$ is H or $CH_3$, and $R^3$ and $R^4$ are $CH_3$ or and a monomer unit represented by the structural formula wherein b is 2 to 100, $R^2$ is H or $CH_3$, and $R^5$ is $CH_2$, $CH_2CH_2$, or $CH_2CH_2CH(CH_3)$; or (B) a cationic polymerization catalyst having the following formula:

and (C) an alicyclic polyfunctional epoxy compound having a molecular weight of 300 or more, and a static viscosity at 25° C. of 1,000 cps or more, wherein the alicyclic polyfunctional epoxy compound has the following structural formula:

wherein a+b+c equals 15.

10. An ink jet recording apparatus provided with an ink jet recording head, wherein the ink jet recording head is that of claim 9.

* * * * *